United States Patent
Weber

(10) Patent No.: US 7,398,392 B2
(45) Date of Patent: Jul. 8, 2008

(54) METHOD FOR USING COMMUNICATION CHANNEL ROUND-TRIP RESPONSE TIME FOR DIGITAL ASSET MANAGEMENT

(75) Inventor: Joseph W. Weber, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 727 days.

(21) Appl. No.: 10/295,456

(22) Filed: Nov. 15, 2002

(65) Prior Publication Data

US 2004/0098583 A1    May 20, 2004

(51) Int. Cl.
*H04L 9/00* (2006.01)
*H04L 9/32* (2006.01)

(52) U.S. Cl. .................. 713/168; 726/4; 380/258
(58) Field of Classification Search .......... 380/258; 713/168; 726/4
See application file for complete search history.

(56) References Cited

U.S. PATENT DOCUMENTS 6,931,131 B1 * 8/2005 Becker, Jr. et al. .......... 380/258

2005/0265503 A1 * 12/2005 Rofheart et al. .............. 375/354

* cited by examiner

*Primary Examiner*—Gilberto Barron, Jr.
*Assistant Examiner*—Jacob Lipman
(74) *Attorney, Agent, or Firm*—Patton Boggs LLP

(57) ABSTRACT

The present method for using communication channel round-trip response time for digital asset management utilizes a predetermined distance between a sending device and a receiving device to prevent unauthorized receipt of digital content when the unauthorized receiving device is located beyond the predetermined distance. When the receiving device requests digital content from the sending device, the sending device replies with a request for an acknowledgement. The receiving device sends the requested acknowledgement. The time between sending the request for an acknowledgement and receipt of the acknowledgement is the actual round-trip response time. The actual round-trip response time is compared to a predetermined response time limit for the predetermined distance and if the actual response time is within the predetermined response time limit, the request for digital content is granted and if the actual round-trip response time is not within the predetermined response time limit, the request for digital content is denied.

13 Claims, 5 Drawing Sheets

METHOD FOR USING COMMUNICATION CHANNEL ROUND-TRIP RESPONSE TIME FOR DIGITAL ASSET MANAGEMENT

FIELD OF THE INVENTION

This invention relates to digital communication and more specifically, to protecting digital content from unauthorized distribution outside of a geographic region.

PROBLEM

It is a problem in the field of digital communication to prevent unauthorized access to digital content sent from a sending device to a receiving device over an insecure communication channel while also providing digital content delivery upon request.

Often, the geographical area within which the digital content is distributed and available for receipt by receiving devices is known, for example, a single home, a secure building or a campus of buildings. When distributing the digital content over an insecure communication channel from the sending device to the receiving device within the geographical area, traditional digital rights management systems use digital authentication, such as shared secrets and key exchange, to verify that the receiver is authorized to receive the digital content. Examples include the PGP (Pretty Good Privacy), Kerberos, DTCP (Digital Transmission Content Protection) and HDCP (High-Bandwidth Digital Content Protection).

The insecure electronic communication channels are used to share part of those secrets to ensure to the sending device that it trusts the receiving device. The communication channel over which the digital content is transferred may be any electronic channel such as the electronic links using the Internet Protocol (IP). Many of the communication channels, including those using IP, do not include a method for determining whether the receiving device is located near or far away from the sending device. The receiving device may be a receiving device located anywhere on the global Internet.

A problem arises when the authentication method used by the sending device to authenticate the receiving device, is compromised. If an unauthorized receiving device acquires the shared secret or the exchanged key, the unauthorized receiving device may use the shared secret or the exchanged key to convince the sending device that the unauthorized receiving device is authorized to receive the digital content. Therefore, it is possible for the sending device to unknowingly send the digital content to an unauthorized receiving device located anywhere on the global Internet. Traditional digital authentication fails to provide an added layer of security wherein the sending device determines whether the authenticated receiving device is within a predetermined area and therefore authorized to receive the distributed digital content.

For this reason, a need exists for a method for preventing distribution of digital content from a sending device to a receiving device located outside of a predetermined area.

SOLUTION

The present method for using communication channel round-trip response time for digital asset management utilizes a predetermined distance between the sending device and the receiving device to prevent unauthorized receipt of the digital content when the unauthorized receiving device is located beyond the predetermined distance from the sending device. When the receiving device requests digital content from the sending device, the sending device replies to the receiving device with a request for an acknowledgement. In response to the request for an acknowledgement, the receiving device sends the requested acknowledgement to the sending device. The time between sending the request for an acknowledgement to the receiving device and receipt of the acknowledgement is the actual round-trip response time. The actual round-trip response time is compared to a predetermined response time limit and if the actual response time is within the predetermined response time limit, the request for digital content is granted and digital content is sent to the requesting receiving device. If the actual round-trip response time is not within the predetermined response time limit, the request for digital content is denied and digital content is not sent to the requesting receiving device.

DETAILED DESCRIPTION

The present method for using communication channel round-trip response time for digital asset management summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Traditional digital rights management systems authenticate receiving devices based on shared secrets or exchanged keys. Examples of traditional digital rights management authentication methods include Pretty Good Privacy (PGP), Digital Transmission Content Protection (DTCP) and High-Bandwidth Digital Content Protection (HDCP) link-copy-protection systems. Insecure electronic communication channels are used to share part of those secrets to ensure to the sending device that it trusts the receiving device. However, electronic channels, such as the IP based Internet, allow the sending devices and the receiving devices to be located anywhere in the world. When the shared secret key is comprised, it is possible for unauthorized receiving devices to use the compromised secret key to convince the sending device that the unauthorized receiving device is authorized to receive the digital content.

Figure 1:
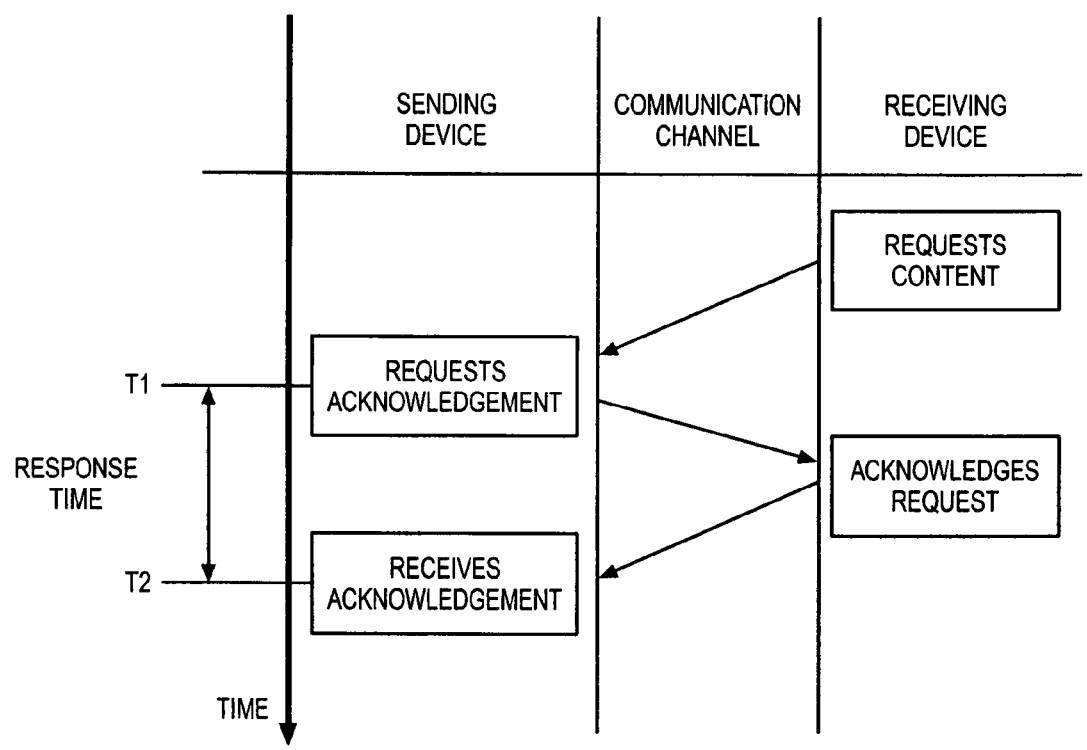
FIG. 1 is a diagram of the round-trip response time in accordance with the present method for using communication channel round-trip response time for digital asset management.

The present method for using communication channel round-trip response time for digital asset management utilizes predetermined distance between the sending device and the receiving device to prevent unauthorized receipt of the digital content when the unauthorized receiving device is located beyond the predetermined distance from the sending device. Referring to FIG. 1, the receiving device requests digital content from the sending device. Upon receipt of the request for digital content, the sending device replies to the receiving device with a request for an acknowledgement. In response to the request for an acknowledgement, the receiving device sends the requested acknowledgement to the sending device. The time between sending the request for an acknowledgement to the receiving device and receipt of the acknowledgement is the round-trip response time. In other words, if the request for an acknowledgement is sent at time T1 as shown in FIG. 1, and the acknowledgement is received by the sending device at T2, the round-trip response time is the difference between T1 and T2.

Figure 2:
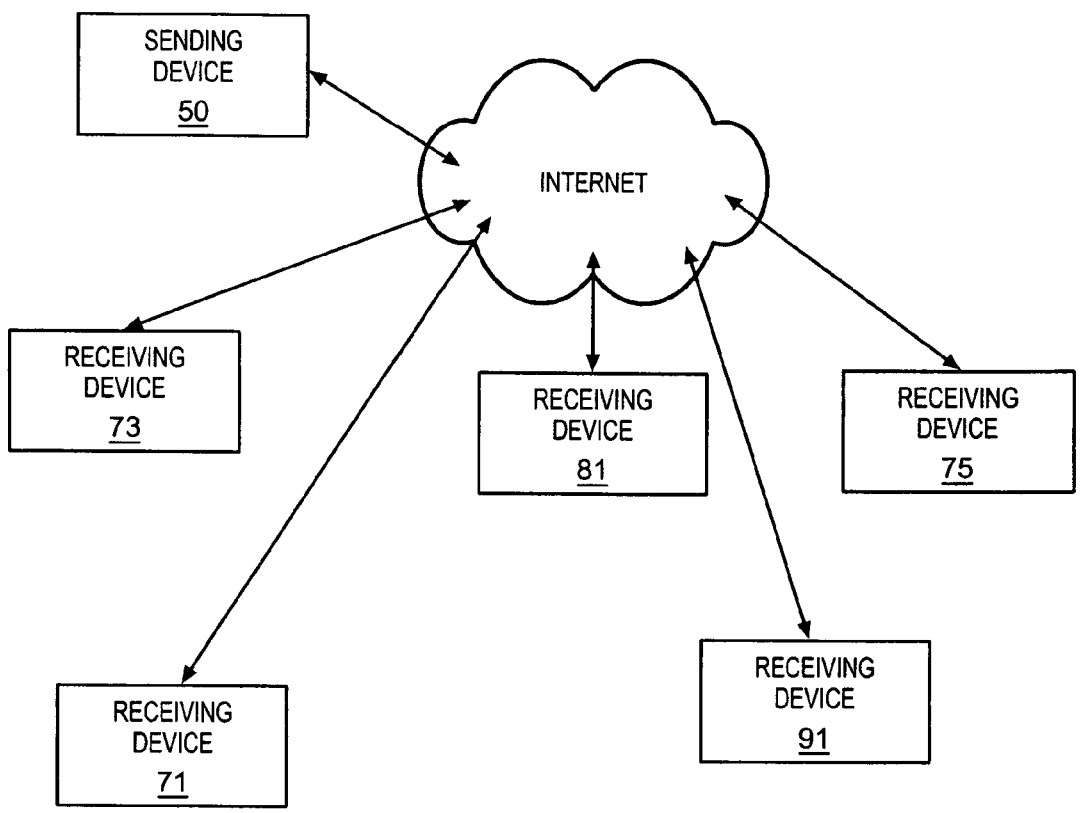
FIG. 2 illustrates an example of receiving devices located a predetermined distance from the sending device in accordance with the present method for using communication channel round-trip response time for digital asset management.

In the example illustrated in FIG. 2, the receiving device 75 has a physical address representing the location of the receiving device 75, and the physical address is known by the sending device 50. Based on the known physical address, sending device 50 determines a distance between sending device 50 and receiving device 75 to further identify receiving device 75. The predetermined distance between sending device 50 and receiving device 75 has a corresponding predetermined response time limit. By calculating the actual round-trip response time using the difference between T1 and T2, and comparing the actual round-trip response time to the predetermined response time limit, sending device 50 is able to determine if receiving device 75 is located within the predetermined distance. If the receiving device is within the predetermined distance from sending device 50, sending device 50 grants the requests for digital content. If the receiving device is not within the predetermined distance from sending device 50, sending device 50 denies the requests for digital content. Using the physical location of receiving devices to determine whether or not the sending device trusts the receiving device limits the number of security breaches to those receiving devices located within the same distance from the sending device as the authorized receiving device 71, such as receiving device 73 in this example. Receiving devices having a distance between the receiving device and the sending device that is greater than or less that the predefined distance, i.e. receiving devices 71, 81 and 91, would not have the ability to breach the added layer of security, and therefore would not received requested digital content even when the receiving device is authenticated using a compromised secrets.

Figure 3:
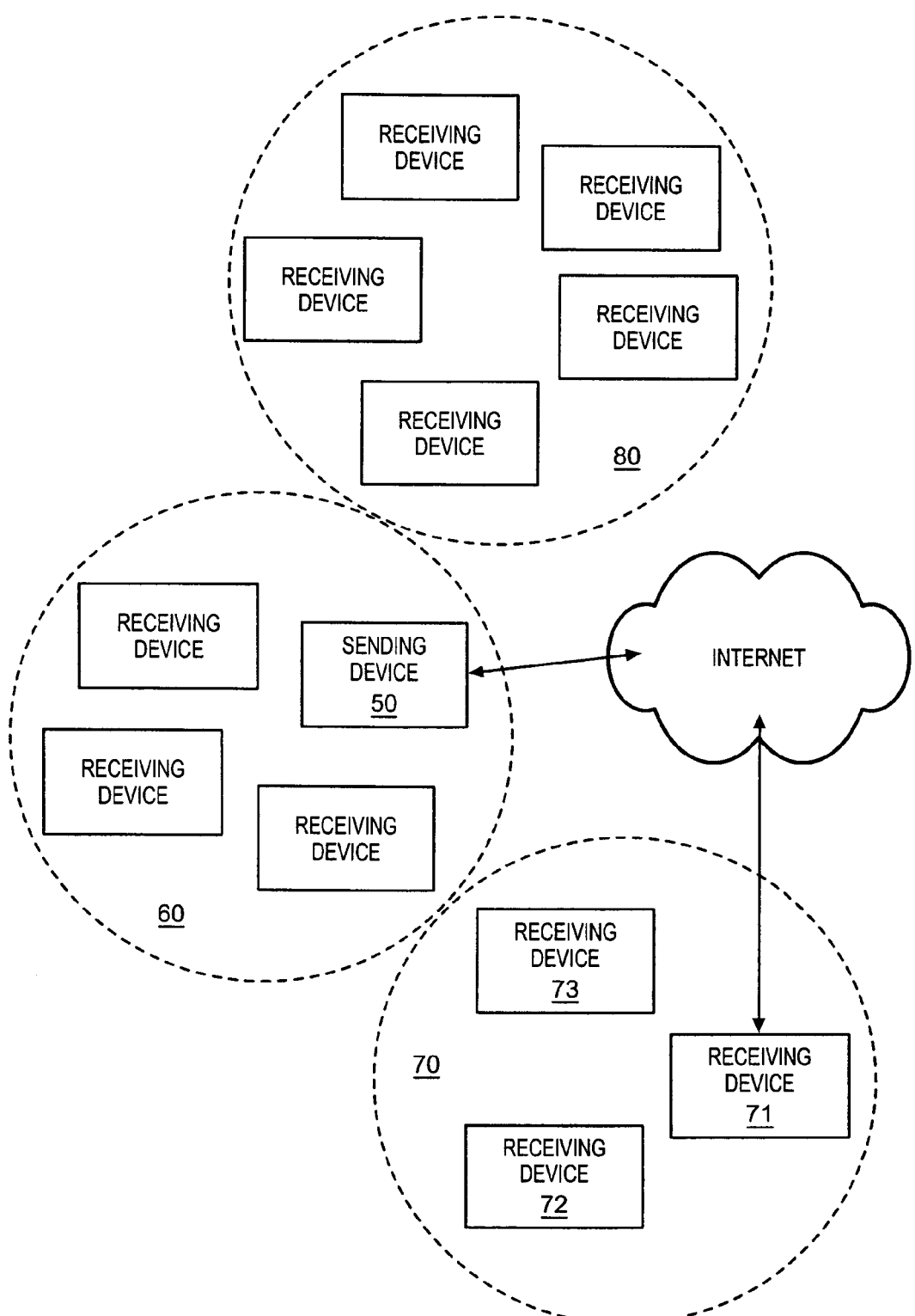
FIG. 3 illustrates an example of receiving devices located within defined geographical areas in accordance with the present method for using communication channel round-trip response time for digital asset management.

In another embodiment, geographical areas are used in place of predetermined distances between the sending device and the receiving device. Referring to the example of receiving devices located within defined geographical areas illustrated in FIG. 3, a sending device 50 may send digital content to receiving devices in more than one geographical area. Each geographical area has a-predetermined round-trip response time corresponding to the geographical area. In this example, receiving devices within the predefined geographical areas 60, 70 and 80 are assigned the predetermined response time limit corresponding to the geographical area in which they are located.

Figure 5:
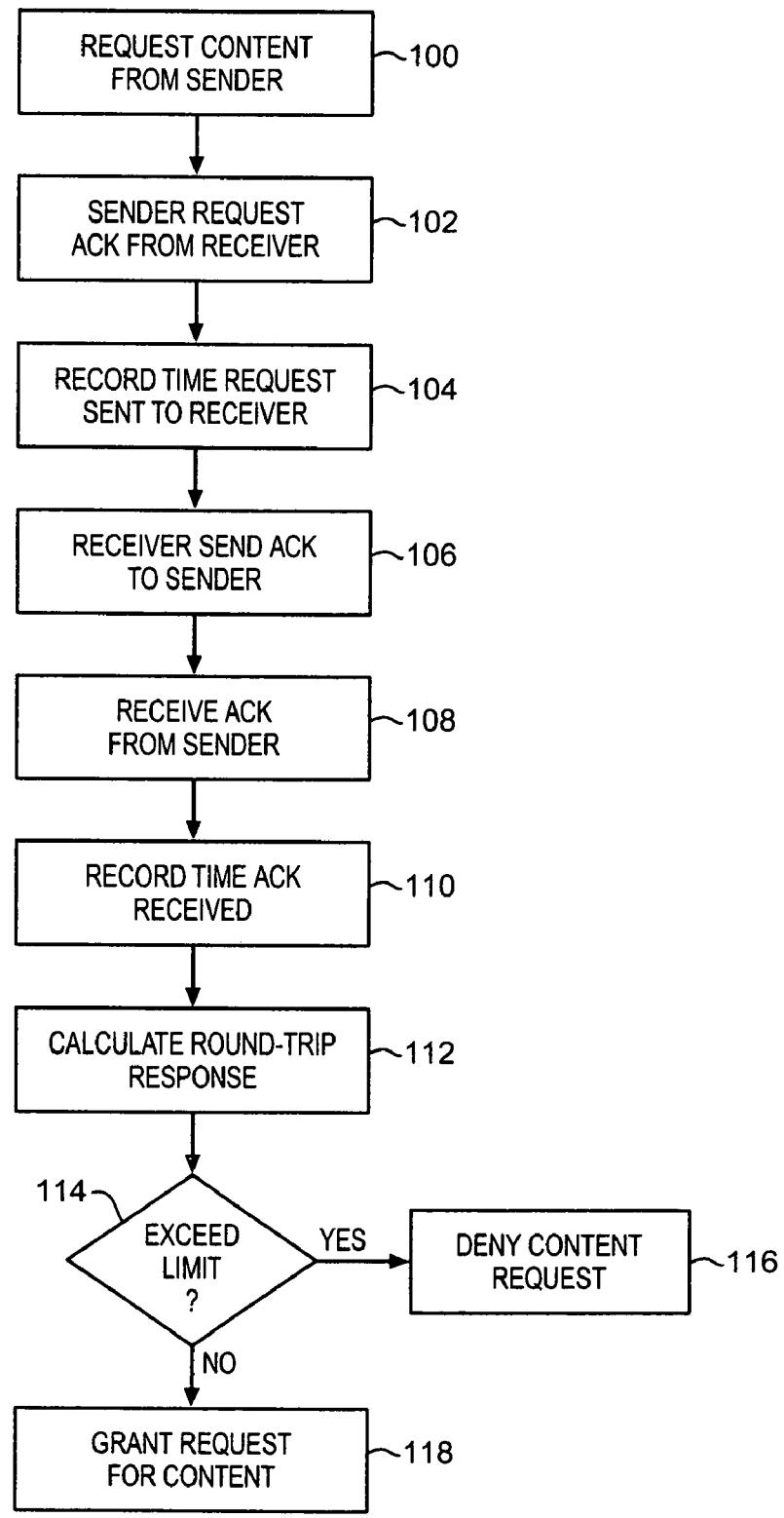
FIG. 5 is a flow diagram illustrating the present method for using communication channel round-trip response time for digital asset management.

Referring to FIG. 2 in conjunction with the flow diagram of FIG. 5, in step 100 sending device 50 located within geographical area 60 receives a request for digital content from receiving device 71 which is located within geographical area 70. Upon receipt of the request for digital content, sending device 50 sends a request for acknowledgement in step 102 to receiving device 71. Substantially simultaneously the sending device 50 records the time in step 104 at which the sending device sent the request for an acknowledgement to receiving device 71. In response to receiving the request for an acknowledgement, in step 106 receiving device 71 sends the requested acknowledgement to sending device 50. Substantially simultaneously to receiving the requested acknowledgement in step 108, sending device 50 records the time at which sending device 50 receives the acknowledgement in step 110.

Using the time recorded in step 104 for sending the request for an acknowledgement and the time recorded in step 110 corresponding to receiving the acknowledgement, the sending device calculates an actual round-trip response time in step 112. The calculated actual round-trip response time is compared to predetermined response time limit for the geographical area in which receiving device 71 is located, geographical area 70 in this example. If the actual round-trip response time is within the predetermined response time limit in step 114, the request for digital content is granted in step 118. However, if the actual round-trip response time exceeds the predetermined response time limit in step 114 for geographical area 70, the request for digital content is denied in step 116. Use of the present method for using communication channel round-trip response time for digital asset management adds an additional layer of securing digital content distributed over insecure communication channels over and above the traditional Digital Rights Management (DRM) systems. Security breaches would be limited to receiving devices within predetermined geographical area 70, i.e. receiving devices 72 and 73. Receiving devices located within predetermined geographical areas 60 and 80 would not have the ability to breach the added layer of security.

Figure 4:
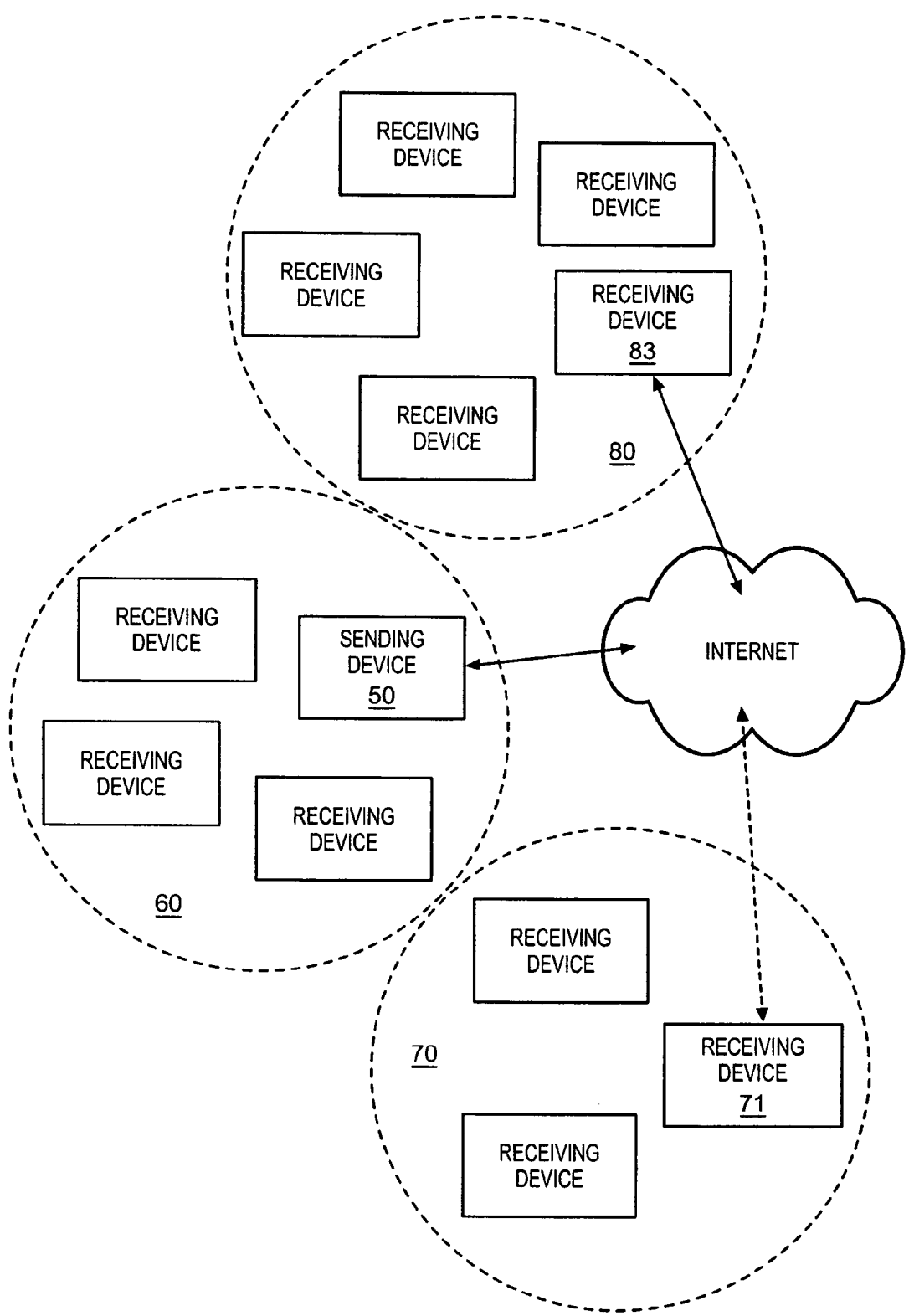
FIG. 4 illustrates another example of receiving devices located within defined geographical areas in accordance with the present method for using communication channel round-trip response time for digital asset management.

In another example illustrated in FIG. 4, sending device 50 receives a request for digital content from receiving device 83. In this example, receiving device 83 has previously comprised receiving device 71 and is using the secret or secret keys of receiving device 71 to convince sending device 50 that receiving device 83 is authorized to receive the requested digital content. Upon receipt of the request for digital content, sending device 50 sends a request for an acknowledgement from receiving device 83. Upon receipt of the request for an acknowledgement, receiving device 83 sends an acknowledgement to sending device 50. As previously described, upon receipt of the acknowledgement, sending device 50 calculates an actual round-trip response time and compares the actual round-trip response time to the predetermined response time limit corresponding to receiving device 71, geographical area 70 in this example. Since receiving device 83 is not within the geographical area 70 of the authorized receiving device 71, the actual round-trip response time is not within the predetermined response limit for geographical area 70, and the request for digital content is denied. Thus preventing unauthorized receiving device 83 from receiving the requested digital content.

As to alternative embodiments, those skilled in the art will appreciate that the present method for using communication channel round-trip response time for digital asset management may be implemented with alternative methods of determining a distance between the sending device and the receiving device. The geographical areas may be adjacent geographical areas as illustrated in FIG. 2, the geographical area may overlap, or may be a geographical area anywhere on the global Internet many miles from the sending device. The predetermined geographical areas have been illustrated as circular area but may be of any size and shape and may or may not be related to physical address characteristics such as area code or zip code. While the predetermined distance and the predetermined geographical areas have been described as having a predefined round-trip response time limit, alternative methods of comparing the actual round-trip response time to a threshold or a set of limits may be substituted.

It is apparent that there has been described method for using communication channel round-trip response time for digital asset management that fully satisfies the objects, aims, and advantages set forth above. While the method for using communication channel round-trip response time for digital asset management has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A method for distributing digital content from a sending device to an authorized receiving device which is located at a predetermined location and whose authentication data has been compromised by an unauthorized receiving device, the method comprising the steps of:
   determining a predetermined distance from said sending device to said authorized receiving device, where said authorized receiving device is located at a predetermined location that is known to said sending device;
   receiving a request for digital content from a device purporting to be said authorized receiving device;
   sending, in response to said request for digital content, a request for acknowledgement to said purported receiving device;
   receiving an acknowledgement, including device authentication data, from said unauthorized receiving device that corresponds to valid device authentication data from said authorized receiving device;
   determining, in response to receiving said acknowledgement from said purported receiving device, an actual round-trip response time for said request for said acknowledgement and the associated acknowledgement; and
   using said actual round-trip response time to determine if said purported receiving device is located a distance from said sending device corresponding to said predetermined distance from said sending device to said authorized receiving device.

2. The method for distributing digital content of claim 1 wherein said step of using said round-trip response time comprises:
   if said actual round-trip response time corresponds to a response time for said predetermined distance, said request for digital content is granted and if said actual round-trip response time does not correspond to a response time for said predetermined distance, denying said request for digital content.

3. The method for distributing digital content of claim 1 wherein said predetermined location is identified by a one of location specific parameters including: a physical address representing a present physical location of said receiving device, and a geographical area in which said receiving device is located.

4. The method for distributing digital content of claim 1 wherein the step of sending a request for acknowledgement comprises:
   recording a first rime representing when said request for said acknowledgement was sent.

5. The method for distributing digital content of claim 4 wherein the step of determining an actual round-trip response time comprises:
   recording a second time representing when said acknowledgement was received at said sending device.

6. The method for distributing digital content of claim 5 wherein the step of determining an actual round-trip response time comprises:
   comparing said first time and said second time to determine said actual round-trip response time.

7. A method for detecting a request for digital content from an unauthorized receiving device which has compromised the authentication of an authorized receiving device, the method comprising the steps of:
   establishing a predetermined reference distance between a sending device and an authorized receiving device, said predetermined reference distance having a corresponding predetermined response time;
   receiving said request for digital content at said sending device from said unauthorized receiving device;
   in response to receiving said request for digital content, sending a request for an acknowledgement to said unauthorized receiving device;
   receiving an acknowledgement including device authentication data, from said unauthorized receiving device that corresponds to valid device authentication data from said authorized receiving device;
   in response to receiving said acknowledgement from said unauthorized receiving device at said sending device, determining an actual round-trip response time; and
   comparing said actual round-trip response time to said predetermined response time, wherein if said actual round-trip response time fails to correspond to said predetermined round-trip response limit for said authorized receiving device, said unauthorized receiving device is not authorized to receive said digital content.

8. The method for detecting a request for digital content from an unauthorized receiving device of claim 7 wherein the step of determining an actual round-trip response time comprises:
   calculating a difference between sending said request for said acknowledgement from said sending device and receiving said acknowledgement from said unauthorized receiving device at said sending device.

9. The method for detecting a request for digital content from an unauthorized receiving device of claim 7 wherein said authorized receiving device is identified by a one of location specific parameters including: a physical address representing a present physical location of said authorized receiving device, and a geographical area in which said authorized receiving device is located.

10. The method for detecting a request for digital content from an unauthorized receiving device of claim 7 wherein the step of sending a request for an acknowledgement comprises:
    recording a time representing when said request for said acknowledgement was sent to said receiving device.

11. The method for detecting a request for digital content from an unauthorized receiving device of claim 10 wherein the step of receiving said acknowledgement from said unauthorized receiving device comprises:
    recording a receive time representing when said acknowledgement was received at said sending device.

12. The method for detecting a request for digital content from an unauthorized receiving device of claim 10 wherein the step of determining an actual round-trip response time comprises:

calculating a difference between said send time and said receive time to determine said actual round-trip response time.

13. A method for preventing distribution of digital content from a source device to an unauthorized destination device located outside of a predetermined geographical area, the method comprising the steps of:

establishing a predetermined reference distance between a source device and an authorized receiving device located in said predetermined geographic area, said predetermined reference distance having a corresponding predetermined response time;

receiving a request from a destination device for said digital content;

said sending device requesting an acknowledgement from said destination device;

receiving an acknowledgement, including device authentication data, from said destination device that corresponds to valid device authentication data from said authorized receiving device;

recording a first time denoting the time that said request for acknowledgement was sent to said destination device;

recoding a second time denoting the time that said acknowledgement from said destination device was received at said source device;

calculating a difference between said first time and said second time to determine a round-trip response time; and comparing said round-trip response time to said predetermined response time, if said round-trip response time fails to correspond to said predetermined response time, denying said request for digital content and if said round-trip response time corresponds to said predetermined response time, granting said request for said digital content.

* * * * *